US008842668B2

(12) United States Patent
Chen et al.

(10) Patent No.: US 8,842,668 B2
(45) Date of Patent: Sep. 23, 2014

(54) METHOD AND APPARATUS FOR UPDATING BINDING RELATIONSHIP OF ASSOCIATED BIDIRECTIONAL LABEL SWITCHED PATH

(75) Inventors: Guoyi Chen, Beijing (CN); Xinchun Guo, Shenzhen (CN); Wei Cao, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 13/243,479

(22) Filed: Sep. 23, 2011

(65) Prior Publication Data

US 2012/0014385 A1 Jan. 19, 2012

Related U.S. Application Data

(63) Continuation of application No. PCT/CN2010/071594, filed on Apr. 7, 2010.

(30) Foreign Application Priority Data

Apr. 8, 2009 (CN) .......................... 2009 1 0106530

(51) Int. Cl.
*H04L 12/28* (2006.01)
*H04L 12/24* (2006.01)
*H04L 12/723* (2013.01)

(52) U.S. Cl.
CPC ............ *H04L 45/50* (2013.01); *H04L 12/2425* (2013.01); *H04L 45/507* (2013.01)
USPC .......................................... 370/389; 370/254

(58) Field of Classification Search
USPC .......................................... 370/254, 389, 474
See application file for complete search history.

(56) References Cited

U.S. PATENT DOCUMENTS

| | | | |
|---|---|---|---|
| 7,940,695 B1 * | 5/2011 | Bahadur et al. ................ | 370/254 |
| 8,488,616 B2 * | 7/2013 | Wijnands et al. .......... | 370/395.5 |
| 2002/0057691 A1 | 5/2002 | Enoki et al. | |
| 2002/0110087 A1 * | 8/2002 | Zelig et al. ..................... | 370/236 |
| 2005/0169266 A1 | 8/2005 | Aggarwal et al. | |
| 2008/0043740 A1 * | 2/2008 | Doverspike et al. .......... | 370/392 |
| 2009/0323521 A1 * | 12/2009 | Tochio .......................... | 370/225 |

FOREIGN PATENT DOCUMENTS

| | | |
|---|---|---|
| CN | 1694431 A | 11/2005 |
| CN | 101123563 A | 2/2008 |
| CN | 101155178 A | 4/2008 |
| WO | WO 2008/009576 A1 | 1/2008 |

OTHER PUBLICATIONS

Written Opinion of the International Searching Authority dated Jul. 15, 2010 in connection with International Patent Application No. PCT/CN2010/071594.

(Continued)

*Primary Examiner* — Phuc Tran

(57) ABSTRACT

Embodiments of the present invention provide a method for updating a binding relationship of an associated bidirectional label switched path (Bidi-LSP). The method includes: sending a request packet to a destination node, where the request packet carries a parameter for updating the binding relationship and is designed to request updating of the binding relationship; receiving a reply packet from the destination node, where the reply packet carries a binding updating processed result and is designed to respond to the request packet; and updating the binding relationship of the associated Bidi-LSP according to the binding updating processed result carried in the reply packet.

20 Claims, 2 Drawing Sheets

(56) References Cited

OTHER PUBLICATIONS

Translation of Office Action dated Oct. 31, 2012 in connection with Chinese Patent Application No. 200910106530.3.
Supplementary European Search Report dated Apr. 18, 2012 in connection with European Patent Application No. EP 10 76 1199.
Communication pursuant to Article 94(3) EPC dated Feb. 26, 2013 in connection with European Patent Application No. EP 10 76 1199.8.
International Search Report dated Jul. 15, 2010 in connection with International Patent Application No. PCT/CN2010/071594.
D. Awduche, et al., "RSVP-TE: Extensions to RSVP for LSP Tunnels", Network Working Group, Dec. 2001, 57 pages.

* cited by examiner

METHOD AND APPARATUS FOR UPDATING BINDING RELATIONSHIP OF ASSOCIATED BIDIRECTIONAL LABEL SWITCHED PATH

CROSS-REFERENCE TO RELATED APPLICATIONS

This application is a continuation of International Application No. PCT/CN2010/071594, filed on Apr. 7, 2010, which claims priority to Chinese Patent Application No. 200910106530.3, filed on Apr. 8, 2009, both of which are hereby incorporated by reference in their entireties.

TECHNICAL FIELD

The present invention relates to the communication field, and in particular, to a method and an apparatus for updating a binding relationship of an associated bidirectional label switched path (Bidi-LSP).

BACKGROUND

As operators' requirements on Bidi-LSPs increase more greatly, how to set up a Bidi-LSP becomes a hot technical topic. In the prior art, a Bidi-LSP is an associated Bidi-LSP. Two unidirectional LSPs that make up the associated Bidi-LSP, namely, a forward LSP and a backward LSP, have the same source node and destination node but may pass through the same or different intermediate nodes and links.

Currently, an associated Bidi-LSP is usually set up through static configuration. That is, two established path-independent unidirectional LSPs which are in opposite direction are bound at the source node and the destination node respectively, namely, manual configuration is performed at the source node and destination node respectively, so that the two unidirectional LSPs are associated statically. However, as the network size grows, the configuration workload increases, and errors tend to increase. Likewise, since the associated Bidi-LSP is removed or changed through manual configuration, the flexibility and feasibility are low.

SUMMARY

Based on the above analysis, embodiments of the present invention are directed to a method and an apparatus with better flexibility and feasibility for updating a binding relationship of an associated Bidi-LSP.

An embodiment of the present invention provides a method for updating a binding relationship of an associated Bidi-LSP, including: sending a request packet to a destination node, where the request packet carries a parameter for updating the binding relationship and is designed to request updating of the binding relationship;

receiving a reply packet from the destination node, where the reply packet carries a binding updating processed result and is designed to respond to the request packet; and updating the binding relationship of the associated Bidi-LSP according to the binding updating processed result carried in the reply packet.

Another embodiment of the present invention provides an apparatus for updating a binding relationship of an associated Bidi-LSP, including:

a communication module, configured to: send a request packet to a destination node, where the request packet carries a parameter for updating the binding relationship; receive a reply packet sent by the destination node, where the reply packet carries a binding updating processed result and is designed to respond to the request packet; and a binding relationship updating module, configured to update the binding relationship of the associated Bidi-LSP according to the binding updating processed result carried in the reply packet.

Another embodiment of the present invention provides a method for updating a binding relationship of an associated Bidi-LSP, including:

receiving a request packet sent by a source node, where the request packet carries a parameter for updating the binding relationship and is designed to request updating of the binding relationship;

updating the binding relationship of the associated Bidi-LSP according to the parameter for updating the binding relationship; and sending a reply packet to the source node, where the reply packet carries a binding updating processed result and is designed to respond to the request packet.

Another embodiment of the present invention provides an apparatus for updating a binding relationship of an associated Bidi-LSP, including:

a receiving module, configured to receive a request packet sent by a source node, where the request packet carries a parameter for updating the binding relationship;

a binding relationship updating module, configured to update the binding relationship of the associated Bidi-LSP according to the parameter for updating the binding relationship; and a sending module, configured to send a reply packet to the source node, where the reply packet carries a binding updating processed result and is designed to respond to the request packet.

In embodiments of the present invention, request and reply packets are interacted between the source node and the destination node of the associated Bidi-LSP to implement dynamic updating of the binding relationship of the associated Bidi-LSP. The technical solutions provided in embodiments of the present invention have better flexibility and feasibility.

DETAILED DESCRIPTION

The present invention is hereinafter described in detail with reference to the drawings and specific embodiments. It should be noted that the embodiments below are only examples for helping understand the technical solutions and are not intended to limit the present invention.

Figure 1:
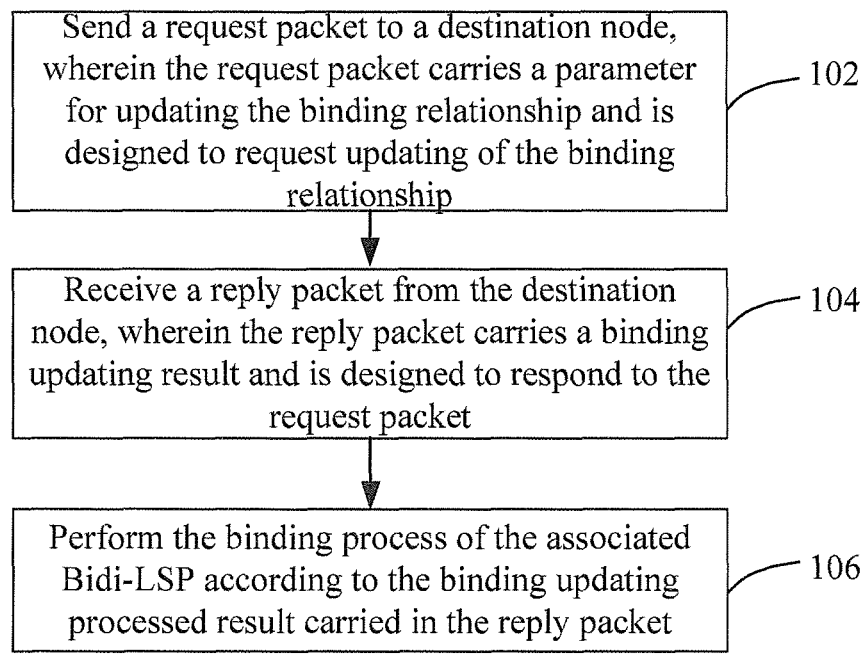
FIG. 1 is a simplified flowchart of a method for updating a binding relationship of an associated Bidi-LSP according to an embodiment of the present invention.

FIG. 1 is a simplified flowchart of a method for updating a binding relationship of an associated Bidi-LSP according to an embodiment of the present invention. The method includes:

102. Send a request packet to a destination node, where the request packet carries a parameter for updating the binding relationship and is designed to request updating of the binding relationship.

104. Receive a reply packet from the destination node, where the reply packet carries a binding updating processed result and is designed to respond to the request packet.

106. Update the binding relationship of the associated Bidi-LSP according to the binding updating processed result carried in the reply packet.

For example, the parameter for updating the binding relationship includes OperFlag.

For example, the request for updating the binding relationship in step 102 may be a request for setting up the binding relationship of an associated Bidi-LSP, that is, a request for binding the two unidirectional LSPs that make up the associated Bidi-LSP. In this case, OperFlag is Setup. The parameter for updating the binding relationship may further include forward LSP information; or the parameter for updating the binding relationship may further include forward LSP information and backward LSP information; or the parameter for updating the binding relationship may further include forward LSP information and backward LSP constraints, or the parameter for updating the binding relationship may further include forward LSP constraints and backward LSP constraints; or the parameter for updating the binding relationship may further include forward LSP constraints and backward LSP information. The request packet in the above examples may be transmitted to the destination node through the forward LSP or through other paths. For another example, when the binding relationship is requested to be established, the parameter for updating the binding relationship includes OperFlag (namely, Setup) and backward LSP information; the request packet is sent to the destination node through the forward LSP, and the destination node obtains, according to the path for receiving the request packet, information of the forward LSP to be bound. For another example, the parameter for updating the binding relationship includes OperFlag (This situation corresponds to Setup) and backward LSP constraints; the request packet is sent to the destination node through the forward LSP, and the destination node obtains, according to the path for receiving the request packet, information of the forward LSP to be bound. For another example, the parameter for updating the binding relationship includes OperFlag (This situation corresponds to Setup); the request packet is sent to the destination node through the forward LSP; the destination node obtains, according to the path for receiving the request packet, information of the forward LSP to be bound, and the destination node determines the backward LSP.

For example, LSP information may include forwarding equivalence class (FEC) information defined in RFC 4379 and so on, or the LSP information may include an LSP 5-tuple, for example, the address of the source node, address of the destination node, LSP ID, tunnel ID, and Extended tunnel ID. For example, LSP constraints may include at least one of bandwidth and Explicit Route, or may include available LSP.

For another example, the request for updating the binding relationship in 102 may be a request for removing the binding relationship. In this case, OperFlag is Remove; the parameter for updating the binding relationship may further include forward LSP information and backward LSP information, or the parameter for updating the binding relationship may further include the ID of the associated Bidi-LSP, such as the name of the associated Bidi-LSP.

For another example, the request for updating the binding relationship in 102 may be a request for changing the binding relationship. For example, LSP1 and LSP2 are bound as an associated Bidi-LSP. Now LSP2 in the associated Bidi-LSP needs to be changed to LSP3. One solution is as follows: the parameter for updating the binding relationship includes OperFlag, where OperFlag is Change; and the parameter for updating the binding relationship may further include LSP1 information and LSP2 information, and include LSP1 and LSP3 information. In another solution, two independent request packets are used to change the binding relationship. That is, a first request packet is sent with a request for removing the binding relationship between LSP1 and LSP2; then a second request packet is sent with a request for setting up a binding relationship between LSP1 and LSP3. For details, refer to descriptions in the embodiments above.

For example, the request packet in 102 may be a Multiprotocol Label Switching (MPLS) Echo Request packet, and carry an Associated Bidi-LSP parameter by extending an LSP Ping (Label Switched Protocol Ping) packet. Interactions are implemented between the source node and the destination node of the LSP. When the binding relationship of the associated Bidi-LSP changes, information and status are synchronized between the source node and the destination node.

Table 1 shows the format of an MPLS Echo packet. The MPLS Echo packet includes two types: MPLS Echo Request packet and MPLS Echo Reply packet. The two types of packets have the same packet format, as shown in Table 1.

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Version Number          |        Global Flags           |
+-+-+-+-+-+-+-+-+-+-+-+-+-+-+-+-+-+-+-+-+-+-+-+-+-+-+-+-+-+-+-+-+
| Message Type|  Reply mode  |  Return Code  | Return Subcode |
+-+-+-+-+-+-+-+-+-+-+-+-+-+-+-+-+-+-+-+-+-+-+-+-+-+-+-+-+-+-+-+-+
|                        Sender's Handle                        |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                    TimeStamp Sent (seconds)                   |
+-+-+-+-+-+-+-+-+-+-+-+-+-+-+-+-+-+-+-+-+-+-+-+-+-+-+-+-+-+-+-+-+
|                  TimeStamp Sent (microseconds)                |
+-+-+-+-+-+-+-+-+-+-+-+-+-+-+-+-+-+-+-+-+-+-+-+-+-+-+-+-+-+-+-+-+
|                  TimeStamp Received (seconds)                 |
+-+-+-+-+-+-+-+-+-+-+-+-+-+-+-+-+-+-+-+-+-+-+-+-+-+-+-+-+-+-+-+-+
|                TimeStamp Received (microseconds)              |
+-+-+-+-+-+-+-+-+-+-+-+-+-+-+-+-+-+-+-+-+-+-+-+-+-+-+-+-+-+-+-+-+
|                            TLVs ...                           |
.                                                               .
.                                                               .
.                                                               .
|                                                               |
+-+-+-+-+-+-+-+-+-+-+-+-+-+-+-+-+-+-+-+-+-+-+-+-+-+-+-+-+-+-+-+-+
```

Version Number: version number of the protocol

Global Flags: global flags

Message Type: message type, indicating a request packet or a reply packet

Reply mode: return mode of the reply packet

Return Code: return code

Return subcode: return subcode, which contains the point in the label stack where processing is terminated Sender Handle: sender handle, indicating the mapping relationship between the reply packet received by the source node and the request packet sent by the source node Sequence Number: sequence number of the packet Timestamp Sent: timestamp of sending the packet Timestamp Received: timestamp of receiving the packet In the case of setting up the binding relationship of the associated Bidi-LSP, on the basis of the MPLS Echo packet shown in Table 1, Associated Bidi-LSP TLV may be added to the request packet in step 102 and the reply packet in step 104 to carry a parameter for updating the binding relationship. For example, the added Associated Bidi-LSP TLV may be in the format shown in Table 2.

TABLE 2

| Associated Bidi-LSP TLV Type | Length |
|---|---|
| OperFlag | Reserve |
| Associated Bidi-LSP Name (ID) | |
| Associated LSPs | |

Associated Bidi-LSP TLV Type: type field, 2 bytes, indicating that the TLV is an associated Bidi-LSP TLV Length: 2 bytes, indicating length of the TLV OperFlag: operation flag, 2 bits, indicating the type of the operation to be performed, which may be setting up, removing, or changing the binding relationship of the associated Bidi-LSP Reserve: reserved for future use Associated Bidi-LSP Name (ID): 4 bytes or more, or defined in a TLV structure, indicating the ID of the associated Bidi-LSP to be updated Associated LSPs: indicating the LSP information or constraints of the forward and backward LSPs of the associated Bidi-LSP For example, the reply packet in 104 may be in the format shown in Table 2. The binding updating processed result carried in the reply packet may be carried by extending Return Code in Table 1. For example, different values are assigned to notify that the operation succeeds or that the specified path does not exist or that constraints are incorrect. For another example, the reply packet in 104 may be in the format shown in Table 3, and the OperResult field shown in Table 3 is used to carry the binding updating processed result.

TABLE 3

| Associated Bidi-LSP TLV Type | | Length |
|---|---|---|
| OperFlag | OperResult | Reserve |
| Associated Bidi-LSP Name (ID) | | |
| Associated LSPs | | |

Associated Bidi-LSP TLV Type: type field, 2 bytes, indicating that the TLV is an associated Bidi-LSP TLV Length: 2 bytes, indicating length of the TLV OperFlag: operation flag, 2 bits, indicating the type of the operation to be performed, which may be setting up, removing, or changing the binding relationship of the associated Bidi-LSP OperResult: operation result flag, 1 byte, indicating the result of processing the associated Bidi-LSP by the destination node, where different values are assigned to notify that the operation succeeds or that the specified path does not exist or that constrains are incorrect Reserve: reserved for future use Associated Bidi-LSP Name (ID): 4 bytes or more, or defined in a TLV structure, indicating the ID of the associated Bidi-LSP to be updated Associated LSPs: indicating LSP information of the forward and backward LSPs of the associated Bidi-LSP For example, the Associated LSPs fields in Table 2 and Table 3 may include both forward LSP information and backward LSP information which are identified respectively by two different TLVs being Forward LSP TLV and Backward LSP TLV. Forward LSP sub-TLV and Backward LSP sub-TLV have the structure of a general TLV, as shown in Table 4.

TABLE 4

| Forward/Backward LSP sub-TLV Type | Length |
|---|---|
| Value | |

Forward/Backward LSP sub-TLV Type: type field, 2 bytes, indicating the TLV is a TLV describing forward LSP information or backward LSP information Length: indicating length of the TLV Value: value information of Forward/Backward LSP TLV, indicating LSP information of the forward LSP or backward LSP that make up the associated Bidi-LSP For example, LSP information may be FEC information defined in RFC 4379. For example, if a Label Distribution Protocol (LDP) Internet Protocol version (IPv4) LSP needs to be bound, LSP information may be an LDP IPv4 FEC defined in RFC 4379, as shown in Table 5. LSP information may also be an LSP quintuple, for example, the address of the source node, address of the destination node, LSP ID, tunnel ID, and extended tunnel ID, as shown in Table 6.

TABLE 5

| Forward/Backward LSP sub-TLV Type | Length |
|---|---|
| FEC sub-TLV | |

Forward/Backward LSP sub-TLV Type: type field, 2 bytes, indicating the TLV is a TLV describing forward LSP information or backward LSP information Length: indicating length of the TLV FEC sub-TLV: indicating the TLV of a forward LSP or a backward LSP

TABLE 6

| Forward/Backward LSP sub-TLV Type | | Length |
|---|---|---|
| | SrcAddr | |
| | DestAddr | |
| TunnelID | | LSPID |
| | ExtendedID | |

Forward/Backward LSP sub-TLV Type: type field, 2 bytes, indicating the TLV is a TLV describing forward LSP information or backward LSP information Length: indicating length of the TLV SrcAddr: address of the source node DestAddr: address of the destination node TunnelID: tunnel ID

LSPID: LSP ID

ExtendedID: extended tunnel ID

When the parameter for updating the binding relationship includes LSP constraints, the packet format shown in Table 7 may be used. When the constraints are Explicit Route, the packet formats shown in Table 8 and Table 9 may be used.

TABLE 7

| Forward/Backward LSP sub-TLV Type | Length |
|---|---|
| Constraints sub-TLV | |

Forward/Backward LSP sub-TLV Type: type field, 2 bytes, indicating the TLV is a TLV describing forward LSP information or backward LSP information Length: indicating length of the TLV Constraints sub-TLV: indicating that constraints may be Explicit Route (explicit route IPv4 or IPv6) or other constraints such as bandwidth and so on.

TABLE 8

| Explicit Route sub-TLV (IPv4) Type | Length |
|---|---|
| IPv4 address (4 byte) | |
| Prefix Length | Reserve |

Explicit Route sub-TLV (IPv4) Type: indicating that the type of the TLV is IPv4-based Explicit Route
  Length: indicating length of the TLV
  IPv4 address (4 bytes): IPv4-based address
  Prefix Length: length of an address prefix
  Reserve: reserved bits

TABLE 9

| Explicit Route sub-TLV (Ipv6) Type | Length |
|---|---|
| IPv4 address (16 byte) | |
| Prefix Length | Reserve |

Explicit Route sub-TLV (IPv6) Type: indicating that the type of the TLV is IPv6-based Explicit Route
  Length: indicating length of the TLV
  IPv4 address (16 bytes): IPv6-based address
  Prefix Length: length of an address prefix
  Reserve: reserved bits In the embodiment shown in FIG. 1, the binding relationship of the associated Bidi-LSP is updated according to the binding updating processed result carried in the reply packet in 106. For example, when the parameter that is used for updating the binding relationship and is carried in the request packet in 102 includes forward LSP information and backward LSP information, Operflag is Setup and the binding updating processed result indicates that operation succeeds, the source node does not require subsequent operations. For another example, when the parameter, which is used for updating the binding relationship and is carried in the request packet in step 102, includes forward LSP information and backward LSP constraints, Operflag is Setup and the binding updating processed result indicates that operation succeeds, the destination node carries LSP information of the bound backward LSP in the binding updating processed result, and the source node finishes binding the associated Bidi-LSP according to the binding updating processed result.

Figure 2:
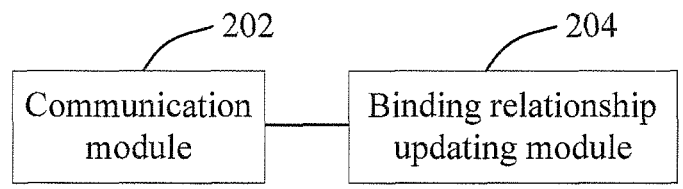
FIG. 2 is a simplified schematic diagram of an apparatus for updating a binding relationship of an associated Bidi-LSP according to an embodiment of the present invention.

FIG. 2 is a simplified schematic diagram of an apparatus for updating a binding relationship of an associated Bidi-LSP according to an embodiment of the present invention. The apparatus includes:

a communication module 202, configured to send a request packet to a destination node, where the request packet carries a parameter for updating the binding relationship and is designed to request updating of the binding relationship; receive a reply packet sent by the destination node, where the reply packet carries a binding updating processed result and is designed to respond to the request packet; and a binding relationship updating module 204, configured to update the binding relationship of the associated Bidi-LSP according to the binding updating processed result carried in the reply packet.

The embodiment shown in FIG. 2 is merely exemplary and other implementation modes may also be used. For example, the communication module 202 may be divided into a sending module and a receiving module; or the communication module 202 and the binding relationship updating module 204 may also be integrated into one unit.

For details about the operations performed by the apparatus shown in FIG. 2, refer to the embodiment shown in FIG. 1.

Figure 3:
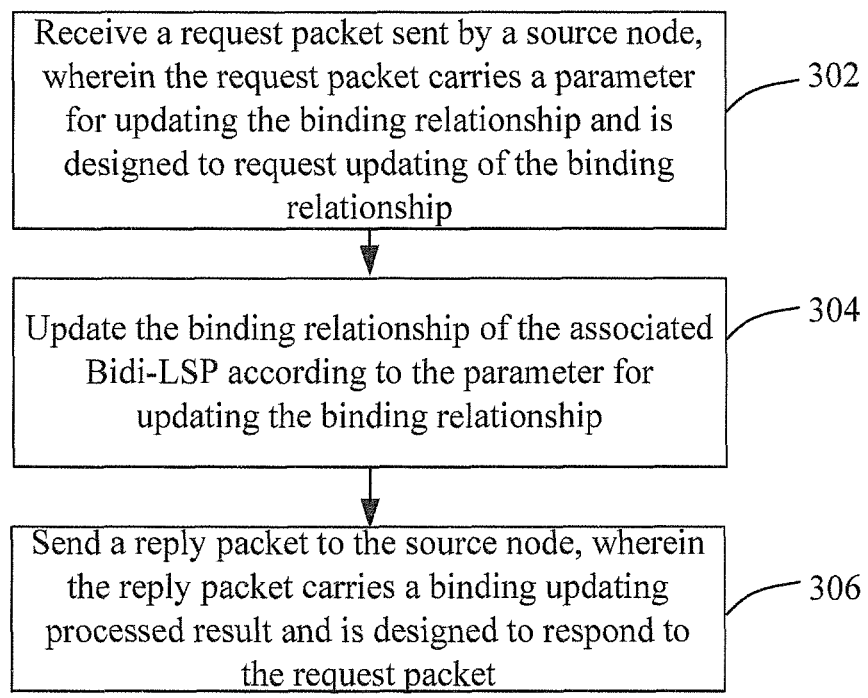
FIG. 3 is a simplified flowchart of a method for updating a binding relationship of an associated Bidi-LSP according to an embodiment of the present invention.

FIG. 3 is a simplified flowchart of a method for updating a binding relationship of an associated Bidi-LSP. As shown in FIG. 3, the method for updating a binding relationship of an associated Bidi-LSP includes:

302. Receive a request packet sent by a source node, where the request packet carries a parameter for updating the binding relationship and is designed to request updating of the binding relationship.

304. Update the binding relationship of the associated Bidi-LSP according to the parameter for updating the binding relationship.

306. Send a reply packet to the source node of the associated Bidi-LSP, where the reply packet carries a binding updating processed result and is designed to respond to the request packet.

For details about the implementation of the method shown in FIG. 3, refer to the embodiment shown in FIG. 1.

Figure 4:
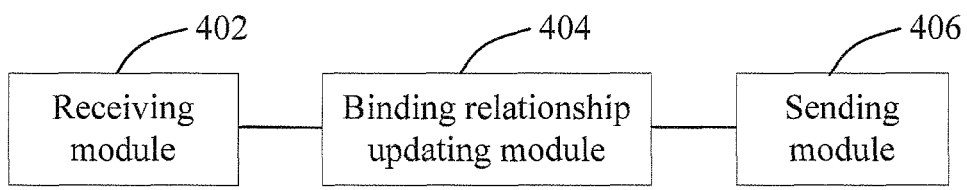
FIG. 4 is a simplified schematic diagram of an apparatus for updating a binding relationship of an associated Bidi-LSP according to an embodiment of the present invention.

FIG. 4 is a simplified schematic diagram of an apparatus for updating a binding relationship of an associated Bidi-LSP according to an embodiment of the present invention. As shown in FIG. 4, the apparatus includes:

a receiving module 402, configured to receive a request packet sent by a source node, where the request packet carries a parameter for updating the binding relationship and is designed to request updating of the binding relationship;

a binding relationship updating module 404, configured to update the binding relationship of the associated Bidi-LSP according to the parameter for updating the binding relationship; and a sending module 406, configured to send a reply packet to the source node, where the reply packet carries a binding updating processed result and is designed to respond to the request packet.

The embodiment shown in FIG. 4 is merely exemplary and other implementation modes may also be used. For example, the receiving module 402 and the sending module 406 are integrated into one communication unit.

In embodiments of the present invention, request and reply packets are interacted between the source node and the destination node of the associated Bidi-LSP to implement dynamic updating of the binding relationship of the associated Bidi-LSP, for example, setting up, removing and dynamically changing the binding relationship of the associated Bidi-LSP. The technical solutions provided in embodiments of the present invention have better flexibility and feasibility, and may satisfy binding requirements of different types of LSPs.

Some of the steps involved in the embodiments of the present invention may be implemented by software. The software program may be stored in a readable storage medium such as a hard disk or a compact disk-read only memory (CD-ROM).

Although the invention has been described through several exemplary embodiments, the invention is not limited to such embodiments. It is apparent that those skilled in the art can make various modifications or replacements to the invention without departing from the spirit and protection scope of the invention. The invention is intended to cover the modifications or replacements provided that they fall within the protection scope of the present invention.

What is claimed is:

1. A method for updating a binding relationship of an associated bidirectional label switched path (Bidi-LSP) comprising two unidirectional LSPs in opposite directions, the method comprising:
    sending a request packet to a destination node, wherein the request packet carries a parameter for updating the binding relationship of the associated Bidi-LSP and is designed to request updating of the binding relationship;
    receiving a reply packet from the destination node, wherein the reply packet carries a binding updating processed result and is designed to respond to the request packet; and
    updating the binding relationship of the associated Bidi-LSP according to the binding updating processed result carried in the reply packet.

2. The method of claim 1, wherein the parameter for updating the binding relationship comprises OperFlag.

3. The method of claim 2, wherein if the OperFlag is setting up the binding relationship of the associated Bidi-LSP, the parameter for updating the binding relationship further comprises at least one of forward LSP information, forward LSP constraints, backward LSP information, and backward LSP constraints.

4. The method of claim 3, wherein the LSP information comprises a forwarding equivalence class (FEC) or an LSP quintuple.

5. The method of claim 2, wherein if the OperFlag is removing the binding relationship of the associated Bidi-LSP, the parameter for updating the binding relationship further comprises an ID of the associated Bidi-LSP or LSP information of two LSPs in the associated Bidi-LSP.

6. The method of claim 5, wherein the LSP information comprises a forwarding equivalence class (FEC) or an LSP quintuple.

7. The method of claim 2, wherein if the OperFlag is changing the binding relationship of the associated Bidi-LSP, the parameter for updating the binding relationship further comprises LSP information of the associated Bidi-LSP and LSP information of two LSPs that are to be bound.

8. The method of claim 7, wherein the LSP information comprises a forwarding equivalence class (FEC) or an LSP quintuple.

9. An apparatus for updating a binding relationship of an associated bidirectional label switched path (Bidi-LSP) comprising two unidirectional LSPs in opposite directions, the apparatus comprising:
    a communication module, configured to send a request packet to a destination node, wherein the request packet carries a parameter for updating the binding relationship of the associated Bidi-LSP; receive a reply packet sent by the destination node, wherein the reply packet carries a binding updating processed result and is designed to respond to the request packet; and
    a binding relationship updating module, configured to update the binding relationship of the associated Bidi-LSP according to the binding updating processed result carried in the reply packet.

10. The apparatus of claim 9, wherein the parameter for updating the binding relationship comprises OperFlag.

11. The apparatus of claim 10, wherein if the OperFlag is setting up the binding relationship of the associated Bidi-LSP, the parameter for updating the binding relationship further comprises at least one of forward LSP information, forward LSP constraints, backward LSP information, and backward LSP constraints.

12. The apparatus of claim 10, wherein if the OperFlag is removing the binding relationship of the associated Bidi-LSP, the parameter for updating the binding relationship further comprises an ID of the associated Bidi-LSP or LSP information of two LSPs in the associated Bidi-LSP.

13. The apparatus of claim 10, wherein if the OperFlag is changing the binding relationship of the associated Bidi-LSP, the parameter for updating the binding relationship further comprises LSP information in the associated Bidi-LSP and LSP information of two LSPs that are to be bound.

14. A method for updating a binding relationship of an associated bidirectional label switched path (Bidi-LSP) comprising two unidirectional LSPs in opposite directions, the method comprising:
    receiving a request packet sent by a source node, wherein the request packet carries a parameter for updating the binding relationship of the associated Bidi-LSP and is designed to request updating of the binding relationship;
    updating the binding relationship of the associated Bidi-LSP according to the parameter for updating the binding relationship; and
    sending a reply packet to the source node, wherein the reply packet carries a binding updating processed result and is designed to respond to the request packet.

15. The method of claim 14, wherein the binding updating processed result comprises an operation success flag or an operation failure flag.

16. The method of claim 15, wherein when the request for updating the binding relationship is a request for setting up the binding relationship of the associated Bidi-LSP and the binding updating processed result comprises the operation success flag, the binding updating processed result further comprises at least one of the following:
    an ID of the associated Bidi-LSP; and
    LSP information of two LSPs that make up the associated Bidi-LSP.

17. The method of claim 15, wherein when the binding updating processed result comprises an operation failure flag, the operation failure flag notifies that a specified path does not exist or that constraints are incorrect.

18. An apparatus for updating a binding relationship of an associated bidirectional label switched path (Bidi-LSP) comprising two unidirectional LSPs in opposite directions, the apparatus comprising:
    a receiving module, configured to receive a request packet sent by a source node, wherein the request packet carries a parameter for updating the binding relationship of the associated Bidi-LSP;
    a binding relationship updating module, configured to update the binding relationship of the associated Bidi-LSP according to the parameter for updating the binding relationship; and
    a sending module, configured to send a reply packet to the source node, wherein the reply packet carries a binding updating processed result and is designed to respond to the request packet.

19. The apparatus of claim 18, wherein the binding updating processed result comprises an operation success flag or an operation failure flag.

20. The apparatus of claim 19, wherein when the request for updating the binding relationship is a request for setting up the binding relationship of the associated Bidi-LSP and the binding updating processed result comprises the operation success flag, the binding updating processed result further comprises at least one of the following:
   an ID of the associated Bidi-LSP; and
   LSP information of two LSPs that make up the associated Bidi-LSP.

* * * * *